Patented Dec. 12, 1950

2,534,136

UNITED STATES PATENT OFFICE 2,534,136

PIGMENTS AND MOLDING POWDERS COMPRISING POLYVINYL ACETAL RESINS DYED WITH VAT DYES

Louis Amédée Lantz, Arthur Schofield, and Ernest Spinner, Manchester, England, assignors to The Calico Printers' Association Limited, Manchester, England, a British company No Drawing. Application March 30, 1948, Serial No. 18,083. In Great Britain April 17, 1947

6 Claims. (Cl. 260—41)

In specification Serial No. 592,918 there is described the preparation of finely divided polyvinyl acetals containing aromatic acetal groups, hereinafter referred to briefly as "polyvinyl benzals" and the production of pigments and of moulding powders or constituents of moulding powders by dyeing such polyvinyl benzals with basic dyestuffs, or with dyestuffs of other classes containing one or more basic groups, or one or more hydroxy groups, and characterised by sparing solubility in water.

The object of the present invention is to provide a method whereby pigments and moulding powders of outstanding merit may be obtained with dyestuffs belonging to the class known as vat dyestuffs.

The usual method of applying a vat dyestuff to textile material, is to reduce it in the presence of an alkali to its water-soluble leuco-derivative, impregnate or dye the material with the leuco-derivative, and subsequently regenerate the original insoluble dyestuff on the material by oxidation.

Vat dyestuffs in their original form have also been used as pigments for application to a variety of materials by means of an adhesive. When applied in such manner, they mostly yield dull colours of an intensity and brightness generally much inferior to that obtainable from the same dyestuffs when dyed on textile materials in the usual manner. Because of these defects, and of the high cost of vat dyestuffs generally, their use in the form of pigments has remained very limited.

The invention provides a process for producing vat colour pigments of a new and improved type, in which the qualities of brightness, colour yield, and fastness are at least equal to those possessed by the same dyestuffs when dyed on textile materials in the usual manner.

The invention comprises dyeing a finely divided polyvinyl acetal containing acetal groups derived from at least one aldehyde of the benzene and naphthalene series, with a leuco-derivative of a vat dyestuff in aqueous medium, washing the dyed polyvinyl acetal to remove unfixed leuco-derivative, oxidising the fixed leuco-derivative to regenerate the original dyestuff, and washing and drying the product.

The polyvinyl benzals and partial polyvinyl benzals used in the present invention are prepared by adding an aldehyde of the benzene and naphthalene series to an aqueous solution of a polyvinyl alcohol, the concentration of the polyvinyl alcohol not exceeding 10% by weight of the reaction mixture, and reacting the same at a temperature not exceeding 80° C. in the presence of a low concentration of an acid catalyst, e. g. up to 0.2% by weight of sulphuric acid or the equivalent thereof, the aldehyde being finely dispersed in the reaction medium before the reaction begins and being present in the proportion of at least 0.1 mol. of aldehyde to 1.0 mol. of alcohol. Preferably the molecular ratio of aldehyde to alcohol is between 0.1:1.0 and 0.8:1.0. The product contains a sufficient number of aromatic acetal groups therein to render it insoluble in water, and is very finely divided, a product having an average particle size not exceeding 3.5 microns and a maximum particle size not exceeding about 10 microns being readily obtainable.

The polyvinyl alcohols used in this process include partial polyvinyl alcohols which, while soluble in water, contain, in addition to hydroxyl groups, either ester groups, or aliphatic acetal groups, or both. Consequently the polyvinyl benzals include also polyvinyl benzals, in which there are ester groups or aliphatic acetal groups or both. Benzals in which only part of the available or potentially available hydroxyl groups have been reacted with an aromatic aldehyde are also included, provided they are insoluble in water. These are referred to as "partial polyvinyl benzals."

The aromatic aldehydes which may be used include benzaldehyde, substitution products thereof such as chloro-benzaldehydes and nitro-benzaldehydes, homologues thereof such as tolualdehydes, and naphthaldehydes.

The dyestuffs known as vat dyestuffs comprise two main groups: (1) indigoid dyestuffs, of which indigo itself, thioindigo, and their halogen, amino, alkyl and alkoxy derivatives are the main representatives, and (2) anthraquinonoid dyestuffs, which are derived from anthraquinone and other polynuclear quinones, such as benzanthrone, pyranthrone, anthanthrone, dibenzanthrone and the like. Dyestuffs belonging to either of these groups are suitable for producing valuable pigments and moulding powders according to the invention.

In carrying out the invention, a solution or dispersion of an alkali salt of the leuco-derivative of a vat dyestuff is prepared by reducing the latter in aqueous medium with sodium or potassium hydroxide and with the addition of dispersing and stabilising agents if required. The polyvinyl benzal is then dyed in this solution or dispersion preferably at elevated temperatures, such as 50–100° C.

Just as in the case of dyeing textile materials with vat dyestuffs, the transfer of the leuco-derivative of the vat dyestuff from the aqueous medium to the polyvinyl benzal does not go to completion, but a certain equilibrium is reached between the amount of dyestuff on the polyvinyl benzal, and its concentration in the residual dye liquor. The leuco-derivatives of the various vat dyestuffs vary somewhat in their degree of affinity for polyvinyl benzal, but in each individual case it is possible to influence the equilibrium position in the direction of a more complete tranfer of the leuco-derivative of the vat dyestuff to the polyvinyl benzal by increasing the concentration of said leuco-derivative in the dye liquor, by increasing the temperature of dyeing, and by the addition to the dyebath of electrolytes, such as sodium chloride and sulphate.

It has also been found that in partial polyvinyl benzals the affinity for leuco-derivatives of vat dyestuffs is higher in products in which the proportion of unreplaced alcoholic hydroxyl groups to ester and/or acetal groups is between about 40:60 and 60:40, i. e. between 40% and 60% of all the groups are free alcoholic hydroxyl groups. With increasing replacement of the hydroxyl groups by acetal groups the affinity gradually diminishes. It is therefore preferable to use such partial polyvinyl benzals possessing not less than 40% unreplaced alcoholic hydroxyl groups for the production of pigments, especially when deep shades are required, so as to effect the best possible exhaustion of the dyebath and economize in the cost of dyeing.

After the dyeing is completed, the liquor may be allowed to cool down slightly, if desired, and the dyed polyvinyl benzal is filtered off, preferably in such a manner as to remove the largest possible amount of residual dyeing liquor. It is then washed expeditiously in order to remove most of the remaining unfixed leuco-derivative before it has time to reoxidise. The fixed leuco-derivative is then oxidised back to the original dyestuff by treating the dyed polyvinyl benzal with an acidified solution of an oxidizing agent, or by stirring it in water or dilute acid, through which air is being bubbled. The pigment is then further washed to remove soluble matter and unfixed dyestuff, if necessary with the aid of a mild alkali and/or a detergent. An oxidizing agent may also be added at this stage if necessary to complete oxidation. The pigment is then finally rinsed and dried.

The pigments according to the present invention are of particular value in cases where excellent fastness to light combined with good fastness to wet treatment is required, such as in the ornamentation of textiles. They may be used for all purposes for which coloured pigments are normally used, such as the preparation of coloured paints, artist's colours, lacquers, varnishes, printing colours and coating compositions for the decoration of fabrics or papers, coloured plastics, and the like. In addition, these pigments can be used with or without the addition of other thermoplastic or thermosetting resins or resin forming compositions, fillers and plasticizers, for the preparation of moulded articles by the application of heat and pressure. The polyvinyl benzal pigments may be mixed with known mineral or organic white or coloured pigments; for instance, pale shades may be obtained from fully dyed polyvinyl benzal pigments by admixture of a white mineral pigment, such as titanium dioxide. Pale shades may also be obtained directly by dyeing the polyvinyl benzal with a correspondingly smaller amount of dyestuff; undyed polyvinyl benzal in finely dispersed form may be used as a white pigment. Mixed shades may be obtained by mixing a polyvinyl benzal pigment with another polyvinyl benzal pigment or with a pigment of a different type, or such mixed shades may be produced directly by dyeing the finely dispersed polyvinyl benzal with two or more dyestuffs which have an affinity for it. Marbled effects may be obtained by incomplete mixing of a polyvinyl benzal pigment with another polyvinyl benzal pigment and/or undyed polyvinyl benzal, followed by moulding by heat and pressure.

The invention is further illustrated by the following examples.

*Example 1*

45 g. of Anthra Yellow GC 24% paste (Rowe, Inst. Chem. Lect. 1938, p. 69) are pasted with 60 ml. of a 33% solution of sodium hydroxide; about 400 ml. of water are added; the mixture is heated to 60° C. and 12 g. of sodium hydrosulphite are dissolved in it. When reduction of the dyestuff is complete, the solution is made up with water to 600 mls.

30 g. of a partial polyvinyl benzal of average particle size not exceeding 3 microns, and in which about 50% of the alcoholic hydroxyl groups are free, are carefully pasted up with about 45 ml. of the solution of leuco vat dyestuff, and the remainder of the solution is gradually stirred into the paste. The mixture is then heated to 80° C. and kept at that temperature for 5 min., after which 90 g. of sodium chloride are added. The temperature is then allowed to fall to 65° C. and the dyeing is continued for another 30 min. Throughout the dyeing operation the liquor is stirred so as to maintain the temperature uniform.

The dyed polyvinyl benzal is then filtered off, washed twice in succession with 15 ml. of cold water on the filter, then transferred into a shallow vessel with as large a surface as possible exposed to the atmosphere and left for about 16 hrs. The oxidation is then completed by treating the powder with 45 ml. of a 1.5% solution of hydrogen peroxide, allowing to stand for 15 min., then adding 10 ml. of glacial acetic acid and 200 ml. of water. After allowing to stand for another 15 min., the pigment is filtered off and washed free from acid. It is then further washed at 95° C. with one litre of a solution containing 2 g. of soap, 1 g. of sodium carbonate, and 1 g. of sodium percarbonate for 30 min., filtered off, washed free from sodium carbonate, and dried. The product is a bright lemon-yellow powder.

*Example 2*

60 g. of Indanthrene Brilliant Orange GK 20% paste, Rowe, l. c., p. 87) are mixed first with 45 ml. of a 10% solution of sodium ricinoleate, and then with 40 ml. of a 33% sodium hydroxide solution; about 400 ml. of water are added, the mixture is heated to 50° C. and 10 g. of sodium hydrosulphite are dissolved in it. After reduction of the dyestuff, the resulting solution is made up to 600 ml. with water.

30 g. of the same partial benzal are carefully pasted up with about 45 ml. of the solution of leuco vat dyestuff, and the remainder of the solution is gradually stirred into the paste. The mixture is then heated to 80 C., and the polyvinyl benzal is dyed at this temperature for 30 min., 45 g. of sodium chloride being added to the dyebath after the first 5 min., and another 45 g. 10 mins. later. The liquor is stirred throughout the dyeing operation.

The dyed polyvinyl benzal is then filtered off, and aftertreated as described in Example 1, except that the use of hydrogen peroxide is unnecessary for completing the oxidation.

The product is a bright orange powder of excellent fastness to light.

*Example 3*

60 g. of Ciba Scarlet G 20% paste (Col. Ind. No. 1228) are mixed first with 45 ml. of a 10% solution of sodium sulphoricinoleate, and then with 60 ml. of a 33% solution of sodium hydroxide, about 400 ml. of water are added, the mixture is heated to 50 C., and 30 g. of sodium hydrosulphite are dissolved in it. When reduction is complete, the solution is made up to 600 ml. with water.

30 g. of the same partial polyvinyl benzal are carefully pasted up and dyed as described in Example 2, except that the dyeing temperature is kept at 90° C. The aftertreatment is the same as in Example 1.

The product is a bright scarlet powder of excellent fastness to light.

*Example 4*

18 g. of Hydron Pink FF powder (Rowe, l. c. p. 73) are mixed first with 45 ml. of a 10% solution of sodium ricinoleate, then with 60 ml. of a 33% sodium hydroxide solution, and about 400 ml. of water are added. The mixture is heated to 80° C., and 18 g. of sodium hydrosulphite are dissolved in it. When reduction is complete, the solution is made up with water to 600 ml.

30 g. of a partial polyvinyl benzal of average particle size not exceeding 3 microns, and in which about 60% of the alcoholic hydroxyl groups are free, are pasted up and dyed as described in Example 2, except that dyeing temperature is kept at 90° C. and no addition of sodium chloride are made. Under these conditions, about 85% of the dyestuff in solution is taken up by the partial polyvinyl benzal.

The liquor is then cooled to 70° C. and kept at that temperature for 15 min. before filtering. The subsequent procedure is as described in Example 1.

The product is a red powder of a bluer and considerably brighter shade than the original dyestuff. It possesses excellent fastness to light.

*Example 5*

30 g. of Durindone Red BS 20% paste (Col. Ind. No. 1207) are mixed first with 45 ml. of a 10% solution of sodium sulphoricinoleate, then with 40 ml. of a 44% solution of potassium hydroxide, and about 400 ml. of water are added. The mixture is heated to 60° C. and 30 g. of sodium hydrosulphite are dissolved in it. When reduction is complete, the solution is made up to 600 ml. with water.

30 g. of the partial polyvinyl benzal used in Example 1 are pasted up and dyed as described in Example 2, except that the temperature of the dyebath is kept at 90° C., and no additions of sodium chloride are made. After dyeing is completed the liquor is cooled to 80° C. and maintained at that temperature for 10 min. before filtering. The subsequent procedure is the same as in Example 1. The product is a bright bluish red powder of excellent fastness to light.

*Example 6*

10 g. of Indanthrene Brilliant Violet 4R 30% paste (Rowe, l. c. page 90) are mixed first with 45 ml. of a 0.4% solution of sodium oleyl sulphate, then with 40 ml. of a 33% solution of sodium hydroxide, and about 400 ml. of water are added. The mixture is heated to 60° C. and 5 g. of sodium hydrosulphite are dissolved in it. When reduction is complete, the solution is made up to 600 ml. with water.

30 g. of the partial polyvinyl benzal used in Example 1 are carefully pasted with about 45 ml. of the solution of leuco-vat dyestuff, the remainder of the solution is gradually added, the liquor is quickly heated to 60° C. and then gradually over a period of 30 min. to 90° C., and kept at that temperature for a further 30 min., under continuous stirring. The aftertreatment of the dyed polyvinyl benzal is as described in Example 1, except that no hydrogen peroxide is required to complete the oxidation.

The product is a deep purple powder of outstanding brightness and of excellent fastness to light. The original dyestuff in powder form is a dull purplish black, devoid of any value as a pigment.

*Example 7*

12 g. of Ciba Blue 2B 40% paste (Col. Ind. No. 1184) are mixed first with 45 ml. of a 4% solution of sodium ricinoleate, then with 40 ml. of a 33% solution of sodium hydroxide, and about 400 ml. of water are added. The mixture is then heated to 60° C. and 16 g. of sodium hydrosulphite are dissolved in it. When reduction is complete, the solution is made up with water to 550 ml.

30 g. of the partial polyvinyl benzal used in Example 1 is pasted with 45 ml. of a 4% solution of sodium ricinoleate, and the solution of the leuco vat dyestuff is gradually stirred into the paste. The liquor is heated to 90° C. and kept at that temperature for 30 min., 60 g. of sodium chloride being added to it after the first 5 min. The subsequent treatment is the same as for Example 1.

The product is a full bright blue pigment of excellent fastness to light.

*Example 8*

45 g. of Caledon Jade Green XN 60% paste (Col. Ind. No. 1101) are mixed first with 45 ml. of a 10% solution of sodium sulphoricinoleate, then with 40 ml. of a 33% solution of sodium hydroxide, and about 400 ml. of water are added. The mixture is then heated to 50° C. and 30 g. of sodium hydrosulphite are dissolved in it. When reduction is complete, the solution is made up with water to 600 ml.

30 g. of a partial polyvinyl benzal of an average particle size not exceeding 3.5 microns, and in which about 40% of the alcoholic hydroxyl groups are free, are carefully pasted with about 50 ml. of the solution of the leuco vat dyestuff, the remainder of the solution is stirred into the paste, and the dyeing is carried out at 90° C. for 30 min., under stirring.

The liquor is then cooled to 70° C. and maintained at that temperature for 15 min. before filtering. The subsequent procedure is the same as for Example 2. The product is a green powder of outstanding brightness and excellent fastness to light.

Example 9

60 g. of Ciba Brown G 40% paste (Col. Ind. Suppl. p. 34) and 12 g. of Caledon Olive R 40% paste (Col. Ind. No. 1150 Suppl. p. 16) are mixed first with 45 ml. of a 10% solution of sodium sulphoricinoleate, then with 60 ml. of a 33% solution of sodium hydroxide, and about 400 ml. of water are added. The mixture is then heated to 80° C. and 30 g. of sodium hydrosulphite are added. When reduction is complete, the liquor is made up with water to 600 ml.

30 g. of the partial polyvinyl benzal used in Example 1 are carefully pasted with about 45 ml. of the solution of the leuco vat dyestuffs, and the remainder of the solution is gradually added. The liquor is then heated to 80° C. and maintained at that temperature for 30 min. under stirring, 60 g. of sodium chloride being added after the first 10 min.

The dyed powder is filtered off and after-treated as described in Example 1.

The product is a chocolate-brown powder of very good fastness to light.

Example 10

A pale green pigment obtained by dyeing a partial polyvinyl benzal in the manner described in Example 8, except that only 1% of dyestuff is used on the weight of the polyvinyl benzal, is intimately mixed with 25% of its weight of dibenzyl phthalate, and the mixture is moulded in a press at a temperature of 140° C. and a pressure of 2 tons sq. in. for 10 mins. The result is a fairly hard, resilient, translucent green moulding.

What we claim is:

1. In the manufacture of pigments and colored molding powders, the process which comprises dyeing a finely-divided, partial polyvinyl acetal of an aromatic aldehyde, selected from the group consisting of aldehydes of the benzene and naphthalene series, and having a ratio of hydroxyl groups to acetal and ester groups ranging from about 40:60 to 60:40; a sufficient number of aromatic acetal groups being present to render said partial polyvinyl acetal insoluble in water; by mixing with said acetal a leuco-derivative of a vat dyestuff in an aqueous alkaline medium containing a reducing agent at a temperature within the range of about 50° to 100° C., washing the dyed acetal to remove unfixed leuco-derivatives, oxidizing the fixed leuco-derivative in an acid medium to regenerate the original dyestuff and recovering the resulting dyed product; the said partial polyvinyl acetal having an average particle size not substantially exceeding 3.5 microns.

2. The method of claim 1 in which a dispersing agent is added to the aqueous medium.

3. The method of claim 1 in which a stabilizing agent is added to the aqueous medium.

4. The method of claim 1 in which an electrolyte is added to the dye liquor to control the transfer of said leuco-derivative from the aqueous medium to the polyvinyl acetal.

5. A product suitable for use as a pigment or colored molding powder made by mixing a finely-divided, partial polyvinyl acetal of an aromatic aldehyde selected from the group consisting of aldehydes of the benzene and naphthalene series, and having a ratio of hydroxyl groups to acetal and ester groups ranging from about 40:60 to 60:40; the said partial polyvinyl acetal containing a sufficient number of aromatic acetal groups to render it insoluble in water and having an average particle size not substantially exceeding 3.5 microns; with a leuco-derivative of a vat dyestuff in an aqueous alkaline medium containing a reducing agent at a temperature within the range of about 50° to 100° C., washing the dyed acetal to remove unfixed leuco-derivatives, oxidizing the fixed leuco-derivative in an acid medium to regenerate the original dyestuff and recovering the resulting dyed product.

6. In the manufacture of pigments and colored molding powders, the process which comprises producing a finely-divided partial polyvinyl acetal of an aromatic aldehyde having an average particle size not substantially exceeding 3.5 microns by reacting an aromatic aldehyde, selected from a group consisting of the aldehydes of the benzene and naphthalene series, with a dilute aqueous solution of a polyvinyl alcohol having a concentration not exceeding 10 per cent by weight of the reaction mixture, at a temperature not exceeding 80° C. and in the presence of an acid catalyst, with the aldehyde being finely dispersed in the reaction medium before the reaction begins and being present in the proportions of at least about 0.1 mole of aldehyde per mole of polyvinyl alcohol, followed by recovering the resulting finely-divided acetal, then dyeing said finely-divided acetal by reacting it with a leuco-derivative of a vat dyestuff in an aqueous alkaline medium containing a reducing agent at a temperature within the range of 50° to 100° C., washing the product to remove unfixed leuco-derivative, oxidizing the fixed leuco-derivative in an acid medium to regenerate the original dyestuff and recovering the resulting dyed product.

LOUIS AMÉDÉE LANTZ.
ARTHUR SCHOFIELD.
ERNEST SPINNER.

REFERENCES CITED

The following references are of record in the file of this patent:

UNITED STATES PATENTS

| Number | Name | Date |
| --- | --- | --- |
| 2,256,808 | Kern | Sept. 23, 1941 |
| 2,313,076 | Klinkenstein | Mar. 9, 1943 |
| 2,332,895 | D'Alelio | Oct. 26, 1943 |
| 2,411,249 | Niederhausern | Nov. 19, 1946 |